United States Patent [19]

Ishikuri et al.

[11] Patent Number: 5,414,759
[45] Date of Patent: May 9, 1995

[54] AUTOMATIC PERSONAL SEARCH TELEPHONE SYSTEM

[75] Inventors: Hiroaki Ishikuri, Kawasaki; Shigenobu Yamamoto, Sapporo, both of Japan

[73] Assignee: Fujitsu Limited, Kanagawa, Japan

[21] Appl. No.: 124,376

[22] Filed: Sep. 20, 1993

Related U.S. Application Data

[63] Continuation of Ser. No. 672,858, Mar. 20, 1991, abandoned.

[30] Foreign Application Priority Data

Mar. 20, 1990 [JP] Japan ................................ 2-68155

[51] Int. Cl.6 .................... H04M 1/04; H04M 3/42
[52] U.S. Cl. ............................ 379/88; 379/89; 379/111; 379/121; 379/207; 379/211; 379/212
[58] Field of Search .............. 379/211, 212, 210, 88, 379/89, 207, 111, 115, 121

[56] References Cited

U.S. PATENT DOCUMENTS

| | | |
|---|---|---|
| 3,728,486 | 4/1973 | Kraus . |
| 4,313,035 | 1/1982 | Jordan et al. ............ 379/211 |
| 4,649,385 | 3/1987 | Aires et al. ............. 379/210 |
| 4,670,900 | 6/1987 | Waldman . |
| 4,752,951 | 6/1988 | Konneker ............... 379/211 |
| 4,852,156 | 7/1989 | Shigenaga .............. 379/216 |
| 4,899,373 | 2/1990 | Lee et al. ............... 379/207 |
| 4,956,861 | 9/1990 | Kondo ................... 379/211 |

FOREIGN PATENT DOCUMENTS

| | | |
|---|---|---|
| 0152908 | 8/1985 | European Pat. Off. . |
| 3826025 | 2/1990 | Germany . |
| 60-10470 | 3/1985 | Japan . |
| 60-109363 | 6/1985 | Japan . |

Primary Examiner—James L. Dwyer
Assistant Examiner—Fan Tsang

[57] ABSTRACT

A telephone system which, when a call terminating subscriber which should receive a call from a call originating subscriber is not at the location of his telephone, a location registration unit is accessed so as to call the telephone nearest to the call terminating subscriber, wherein, even when the registration in the location registration unit is not correct, the location information source is referred to deduce the correct location of the call terminating subscriber. This location information source contains various types of sensor information and schedule management information showing the whereabouts of the call terminating subscriber.

26 Claims, 19 Drawing Sheets

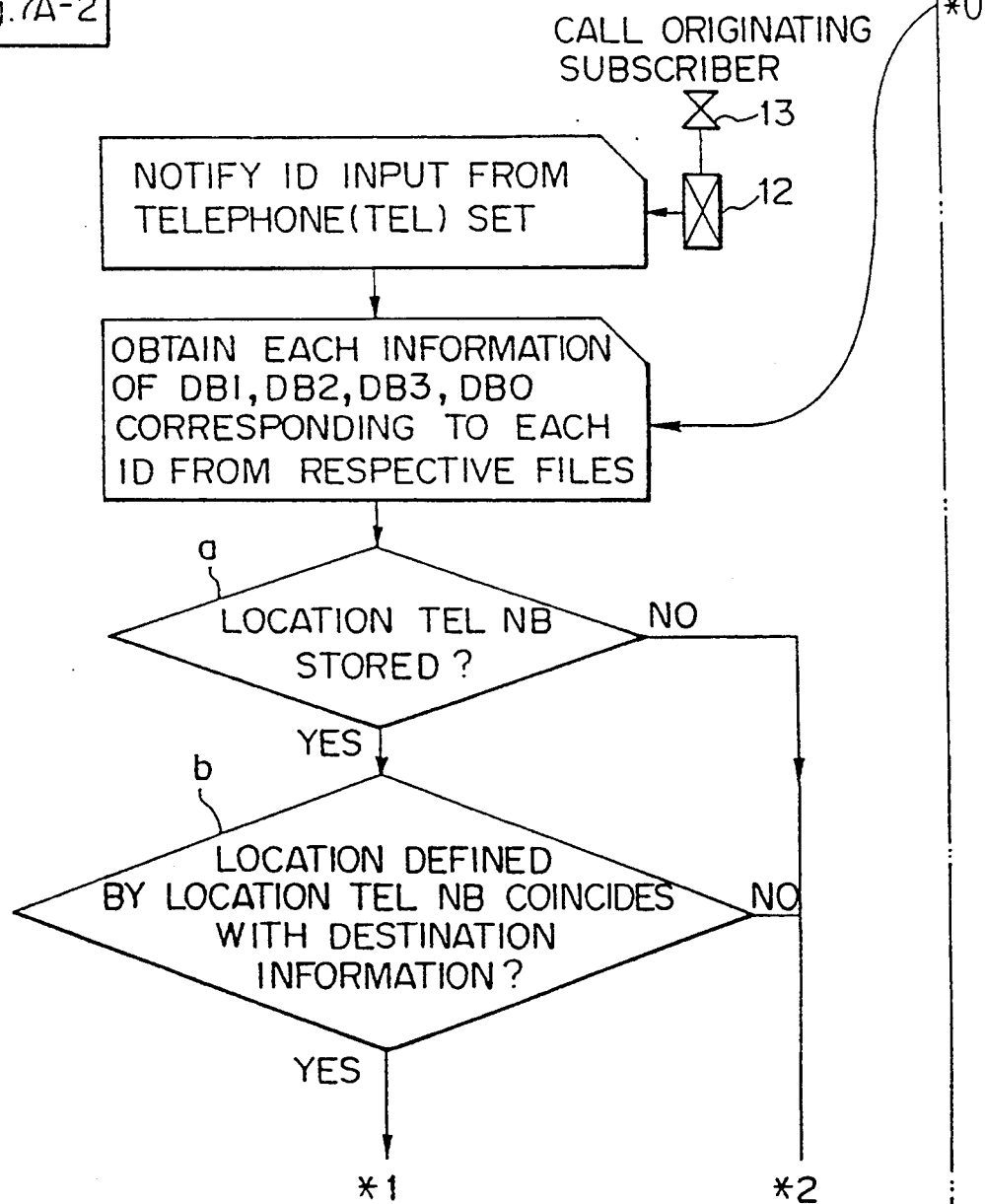

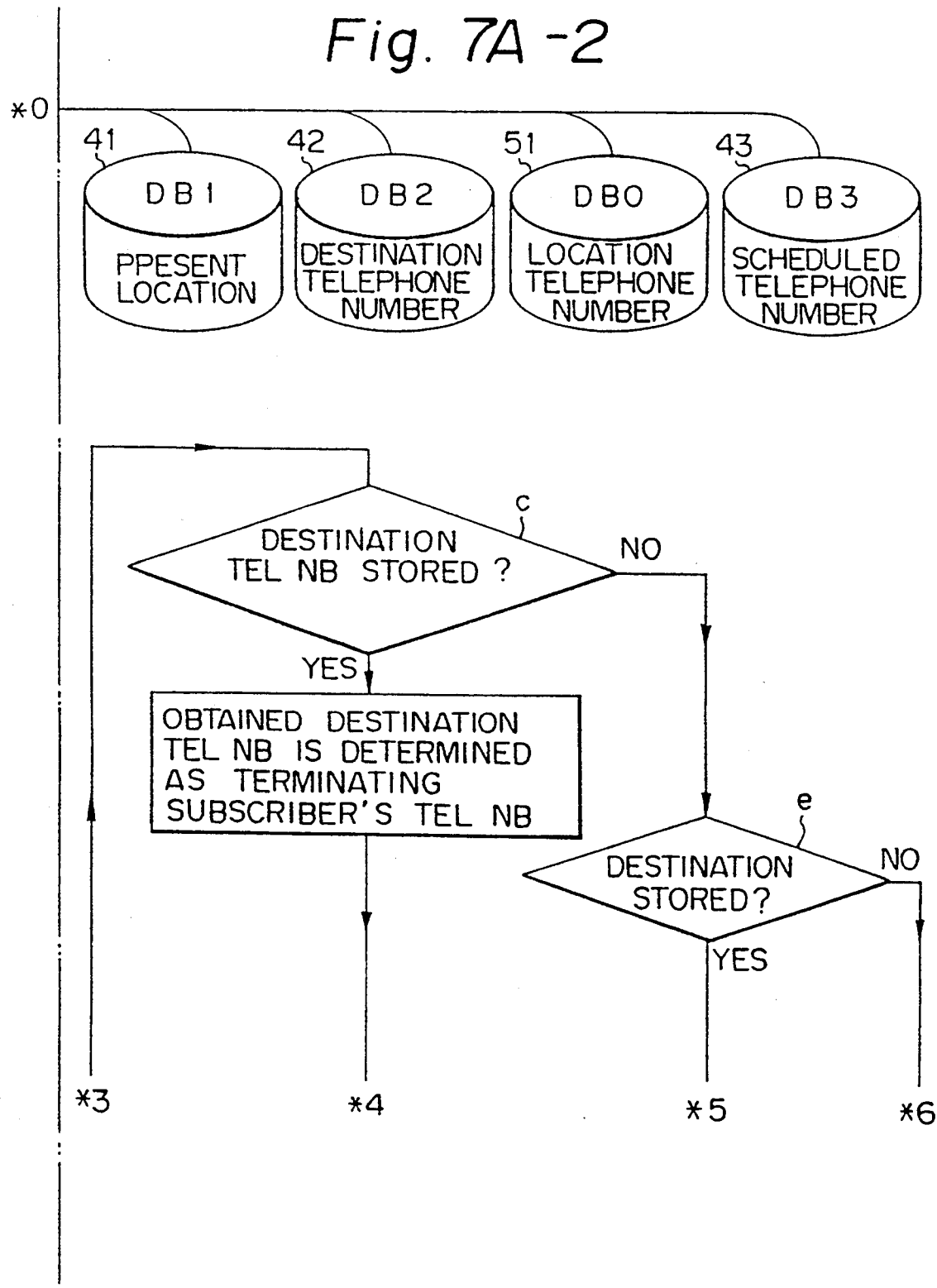

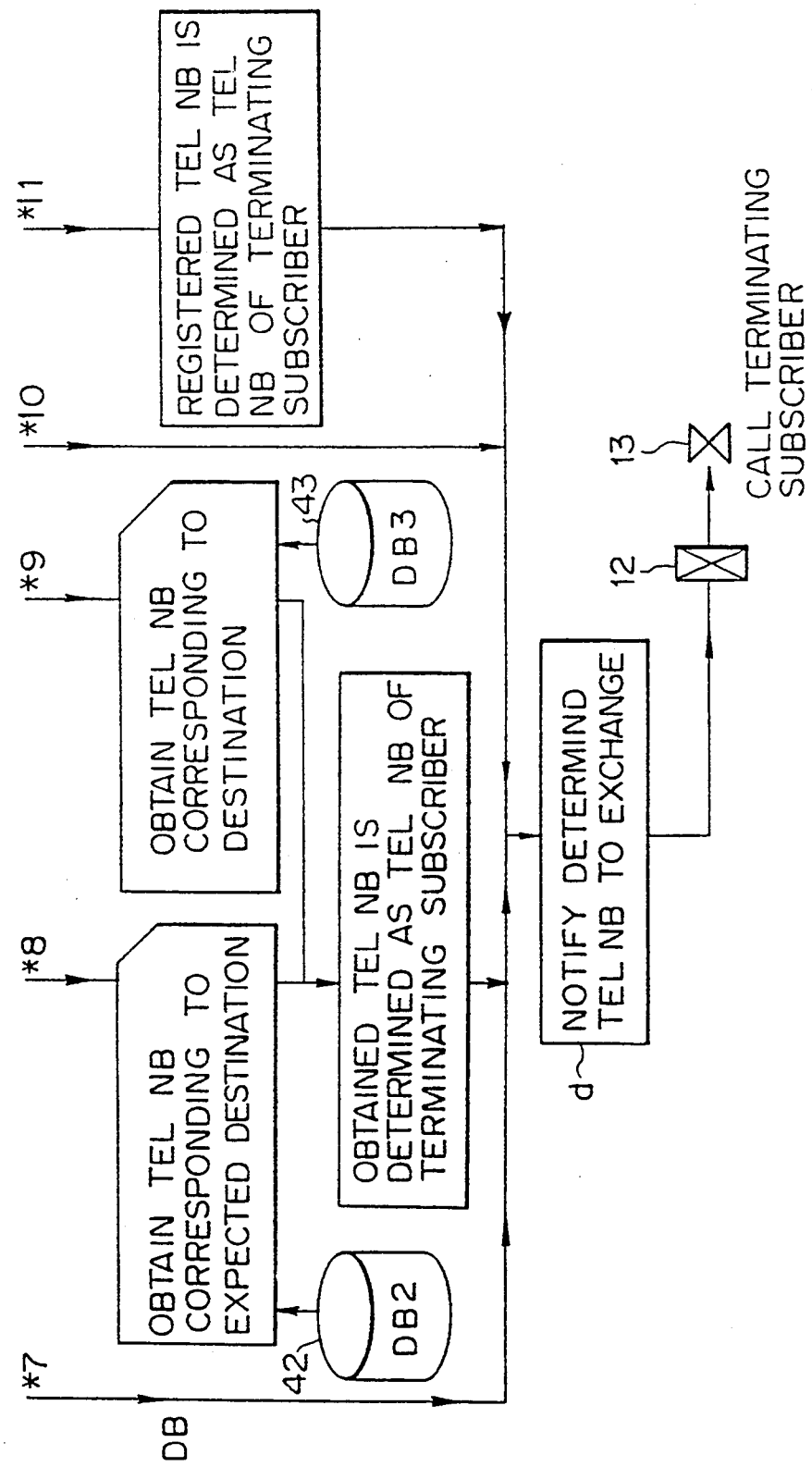

AUTOMATIC PERSONAL SEARCH TELEPHONE SYSTEM

This is a continuation of application Ser. No. 672,858, filed Mar. 20, 1991, now abandoned.

BACKGROUND OF THE INVENTION

1. Field of the Invention

The present invention relates to an automatic personal search telephone system including an exchange which accommodates a plurality of subscriber telephone sets and an automatic personal search telephone apparatus which is connected to the exchange and which has a location telephone number registration means which, when receiving a personal identification number of a call terminating subscriber from a subscriber telephone set of a call originating subscriber, reads out from the registration area corresponding to that personal identification number the telephone number of the call terminating subscriber at the present location of the subscriber and outputs it to the exchange.

Along with the diversification of systems for electronic exchanges in recent years, there has been a spread in use of automatic personal search telephone systems which can call to a location where a call terminating subscriber has gone by giving personal identification numbers to specific individuals and having not the telephone number but the personal identification number entered. This enables much swifter and reliable connection of a call originating subscriber to a call terminating subscriber and improves the efficiency of work.

2. Description of the Related Art

As discussed in detail later, the automatic personal search telephone apparatus constituting the automatic personal search telephone systems of the past have included location telephone number registration means.

Such a location telephone number registration means is connected to an exchange which accommodates a plurality of subscriber telephone sets and, when receiving a personal identification number of a call terminating subscriber from the subscriber telephone set of the call originating subscriber, reads out from the registration area corresponding to the personal identification number the telephone number of the subscriber telephone at the current location of the call terminating subscriber and outputs it to the exchange 12. Therefore, when the call terminating subscriber goes somewhere, it is necessary to register in advance in the location telephone number registration means, through the exchange, the telephone number of the other subscriber telephone set at that location.

Once registered, if a call originating subscriber calls a call terminating subscriber using the personal identification number, even if the call terminating subscriber moves from the home position (place of subscriber telephone originally allocated to the subscriber telephones) to another location, the call originating subscriber can chase after the call terminating subscriber to the subscriber telephone set at the destination with the aid of the location telephone number registration means and therefore conversation between the two subscriber telephone sets becomes possible.

When the call terminating subscriber forgets to register again after once registering despite his going to another location or when he originally did not register his telephone number, the call terminating subscriber cannot be reached at his destination. Therefore, the personal search telephone function can only be used by the call originating subscriber when the call terminating subscriber has registered the telephone number of his destination at that destination and is at the registered destination. Therefore, even if the personal identification number is sent from the subscriber telephone set, when the call terminating subscriber has not recorded the telephone number of his destination at that destination or he is not at a destination where there is a subscriber telephone set with a telephone number of the destination, there is the problem that the call terminating subscriber cannot be reached.

SUMMARY OF THE INVENTION

The present invention has as its object to provide an automatic personal search telephone system which can raise the probability of accessing a call terminating subscriber, despite the call terminating subscriber going to another location, even when the location registered in the location telephone number registration means and the actual location of the call terminating subscriber do not match due to the call terminating subscriber forgetting to update the registration in the location telephone number registration means.

To attain the above object, the present invention is comprised as follows. The automatic personal search telephone system of the present invention includes an automatic personal search telephone apparatus and an exchange which cooperates with the automatic personal search telephone apparatus and, when receiving a call by a personal identification number, terminates the call at the nearest telephone set to the call terminating subscriber corresponding to that personal identification number.

The automatic personal search telephone apparatus includes a location telephone number registration means which registers the current telephone number of the call terminating subscriber, a destination detection means which detects the current destination of the call terminating subscriber, a destination telephone number extracting means which stores the telephone number of the destination corresponding to the destination of the call terminating subscriber, and a location telephone number determination means which specifies the telephone number of the location of the call terminating subscriber by the location telephone number registrations or the destination telephone number extracting means which extracts the telephone number obtained from the position of the call terminating subscriber detected by the destination detecting means.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 1:
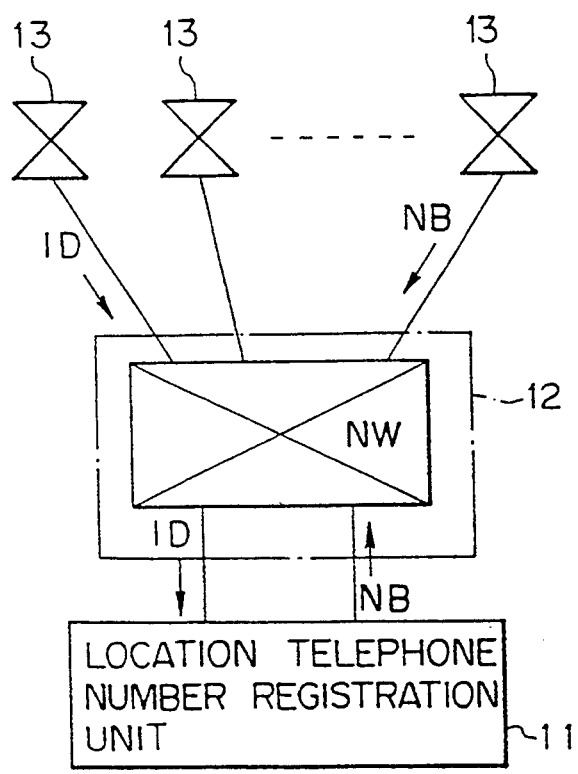
FIG. 1 is a view showing a general automatic personal search telephone system.

FIG. 1 is a view showing a general automatic personal search telephone system. In the figure, reference numeral 11 is a location telephone number registration means serving as the center of the automatic personal search telephone apparatus and reference numeral 12 is an exchange, including inside a network NW. The term "location telephone number" means a telephone number of the telephone set which is located nearest to a current location of the call terminating subscriber, which telephone number has been registered by the call terminating subscriber. The automatic personal search telephone apparatus includes, in addition to the location telephone number registration means 11, an interface unit (not shown) etc. in the exchange 12. Reference numeral 13 represents a plurality of subscriber telephone sets. As mentioned earlier, the location telephone number registration means 11 is connected to the exchange 12 which accommodates a plurality of subscriber telephone sets 13 and, when receiving a personal identification number of a call terminating subscriber from the subscriber telephone set of the call originating subscriber (for example, the telephone set of the left side), reads out from the registration area (not shown) corresponding to the personal identification number ID the telephone number NB of the subscriber telephone set 13 at the current location of the call terminating subscriber and outputs it to the exchange 12. Therefore, when the call terminating subscriber goes somewhere, it is necessary to register in advance in the location telephone number registration means 11, through the exchange 12, the telephone number NB of the other subscriber telephone set 13 (for example, the telephone set at the right side) at that location.

Figure 2:
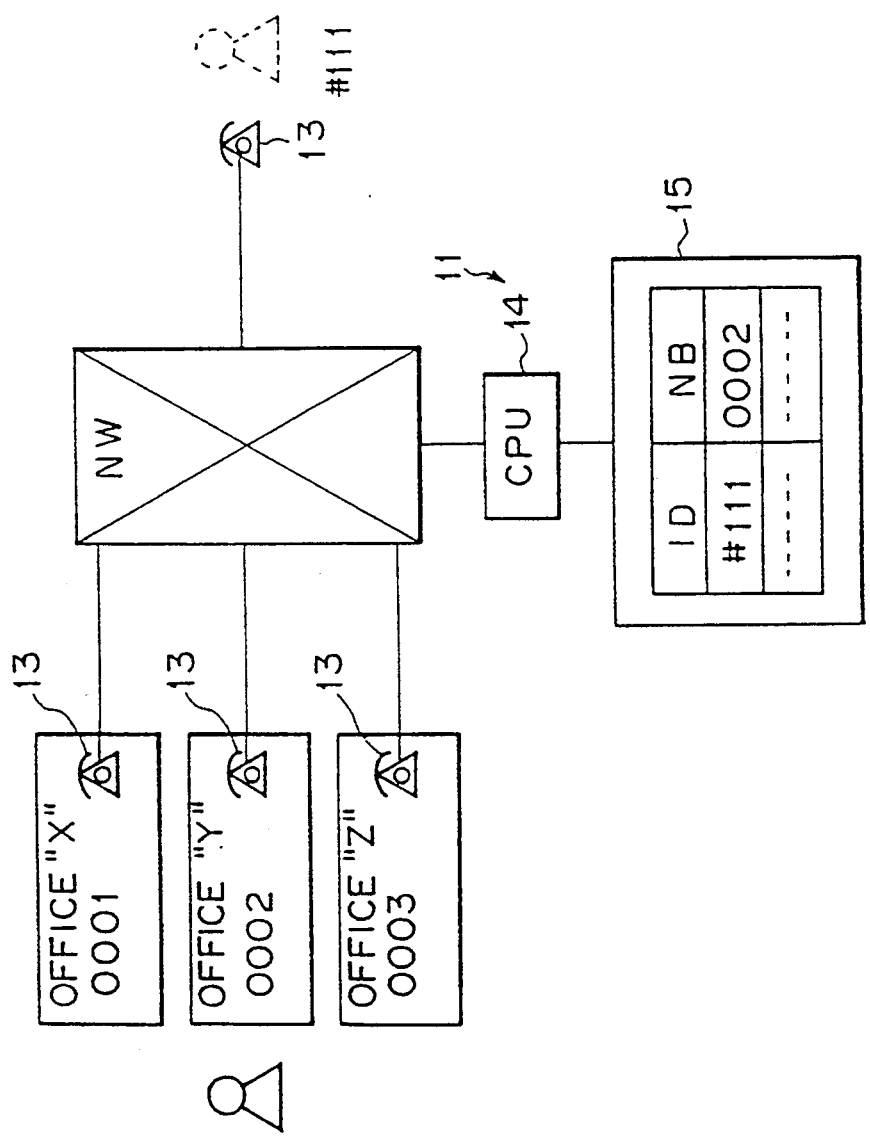
FIG. 2 is a view more specifically showing the conventional system of FIG. 1.

FIG. 2 is a view more specifically showing the conventional system of FIG. 1. The above-mentioned registration area is formed in the memory 15. The reading and writing operations with respect to the memory 15 are performed by a central processing unit (CPU) 14. According to the example of the figure, a subscriber (ID is #111) with the telephone set 13 at the right side of the figure as the home position is shown as changing his location to office "Y".

In the general automatic personal search telephone system shown in FIG. 1 and FIG. 2, the problems mentioned earlier exist. That is, if a call terminating subscriber forgets to change his registration in the location telephone number registration means 11 despite he have moved and changed his location, the location registered in the location telephone number registration means and the actual location of the call terminating subscriber will no longer match and the probability of being able to access the call terminating subscriber without error will end up lower. Below, a detailed explanation will be made of the automatic personal search telephone system according to the present invention.

Figure 3:
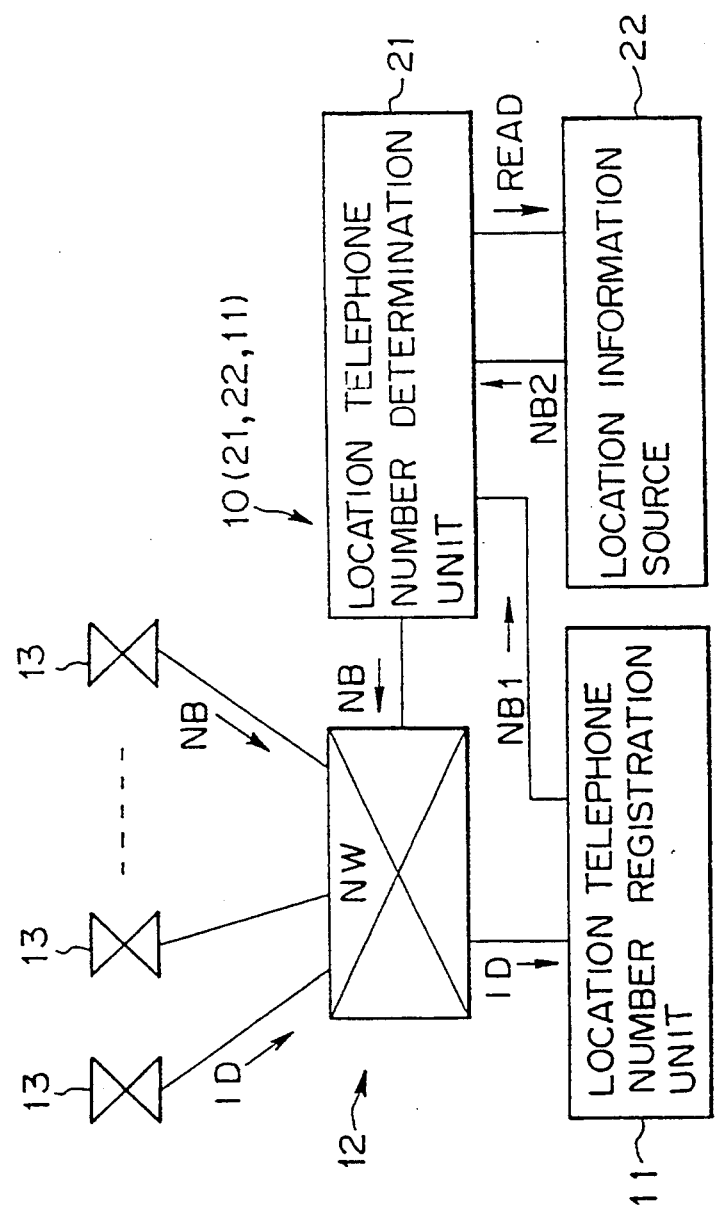
FIG. 3 is a block diagram showing the principle and construction of the system of the present invention.

FIG. 3 is a block diagram showing the principle and construction of the system of the present invention. In the figure, the automatic personal search telephone apparatus 10 according to the present invention has the above-mentioned location telephone number registration means 11 and also a location telephone number determining means 21 and location information source 22. The location telephone number determining means 21 receives as input the first information NB1 read out from the location telephone number registration means 11 and the second information NB2 specifying more accurately the first information NB1, determines the location telephone number NB envisioned as where the call terminating subscriber is currently located, and outputs it to the exchange 12. Further, the location information source 22 collects and holds information on the movements of the call terminating subscriber to so as provide the second information NB2.

The information registered in the location telephone number registration means 11 (first information NB1) is not guaranteed to be accurate at all times. Therefore, the first information NB1 is specified much more accurately by the second information NB2. This second information NB2 is collected independently and provided from the location information source 22. This location information source 22, for example, collects and holds information on the current destination of the call terminating subscriber, information on telephone numbers of the destinations, information on schedule, management etc.

Figure 4:
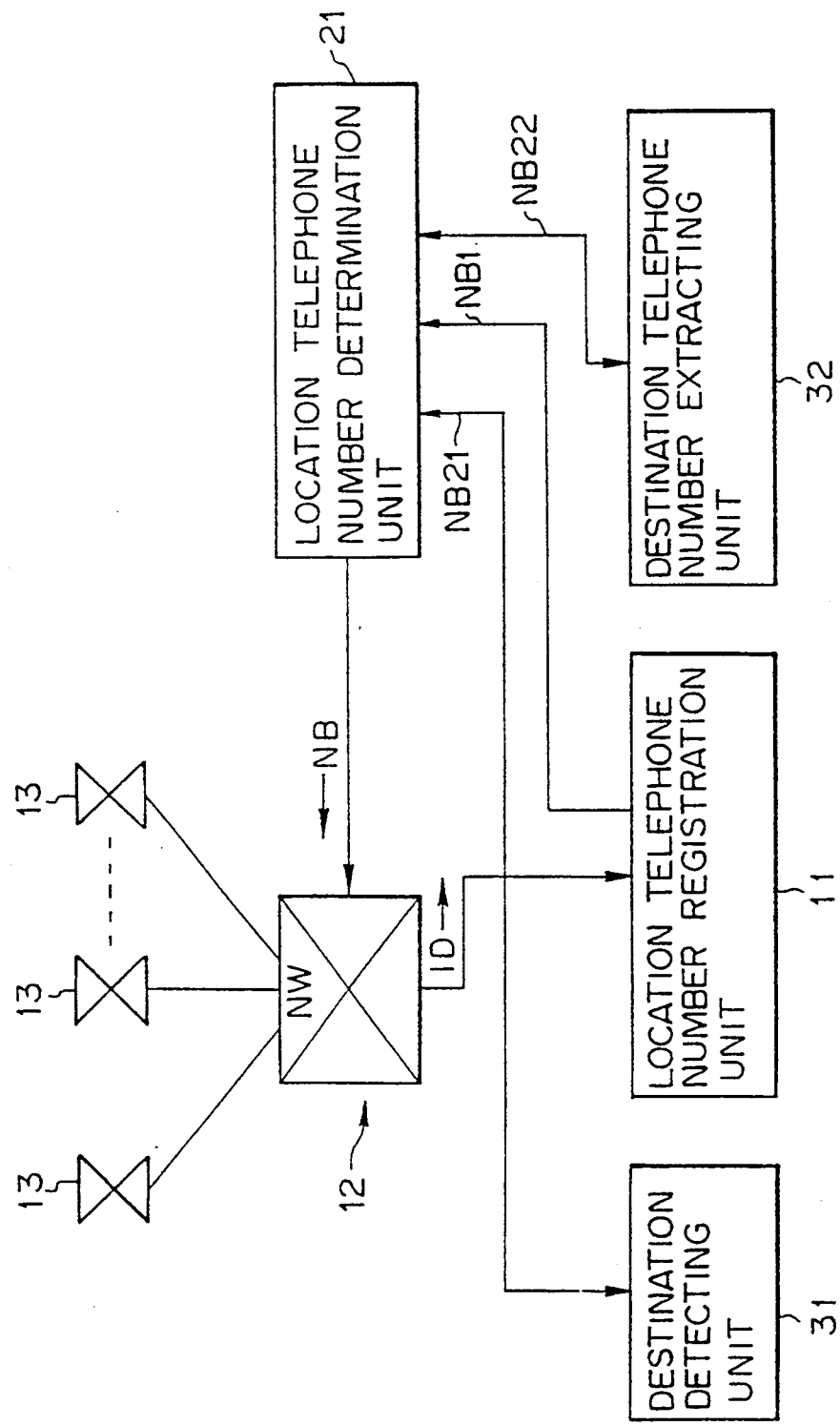
FIG. 4 is a view showing a first embodiment of the system according to the present invention.

FIG. 4 is a view showing a first embodiment of the system according to the present invention. In the figure, portions given the reference numerals 11, 12, 13, and 21 and signals shown by reference characters ID, NB, and NB1 are as explained in reference to FIG. 3. Therefore, in FIG. 4, the location information source 22 and second information NB2 of FIG. 3 are shown in more detail. That is, the location information source 22 of FIG. 3 is shown more specifically in FIG. 4 as the destination detecting means 31 and the destination telephone number extracting means 32. Further, the second information NB2 in FIG. 3 is shown more specifically as the destination detecting information NB21 and the destination telephone number extraction information NB22 which are respectively provided from the above-mentioned means 31 and 32 to the location telephone number determining means 21. Note that the destination telephone number extraction information NB22 is provided from the system designer of the telephone system or manager of the office in question. Further, NB21 is linked with NB22. When a telephone number cannot be specified by NB21 alone, reference is made to the means 32.

Explaining this in more detail, the exchange 12 is an electronic exchange and can connect to a subscriber telephone set 13 corresponding to an input personal identification number from any other subscriber telephone set 13 and can start up individual services from a location telephone number determining means 21 corresponding to that input personal identification number.

The destination detecting means 31 is, for example, an entry/exit managing apparatus which is installed in offices having entry/exit management systems which manage the entry and exit of call terminating subscriber at a building, grounds, office, etc. using IC cards etc. and manages destination information corresponding to the personal identification numbers of the call terminating subscribers.

The destination telephone number extracting means 32 is a telephone number designation apparatus for different destinations and manages and designates the key telephone numbers of destinations which may be used by the above entry/exit management systems and key numbers of the smallest units of destinations such as departments, sections, work floors, and customers. The location telephone number determining means 21 is a destination telephone number determining apparatus which retrieves, compares, and checks information with respect to the personal identification numbers input from the subscriber telephone sets 13 by the destination detecting means 31 and destination telephone number extracting means 32, determines the telephone number of the destination of the call terminating subscriber, and notifies the same to the exchange 12.

In the present invention, the personal identification number input from the subscriber telephone set 13 as shown in FIG. 4 gives the destination, area scheduled to be traveled to, and other second information NB21 and NB22 from the destination detecting means 31 and destination telephone number extracting means 32 by the location telephone number determining means 21. Based on the obtained second information, the priority etc. are considered and a decision made on the telephone number of the location of the destination or the key telephone number of the area scheduled to be traveled to.

Therefore, even if the call terminating subscriber forgets to register the telephone number of the location of his destination at the destination or even if he registers it and then goes somewhere else, it becomes possible to follow the call terminating subscriber to his destination and call him there even when not registering again the telephone number of the new destination location.

Figure 5:
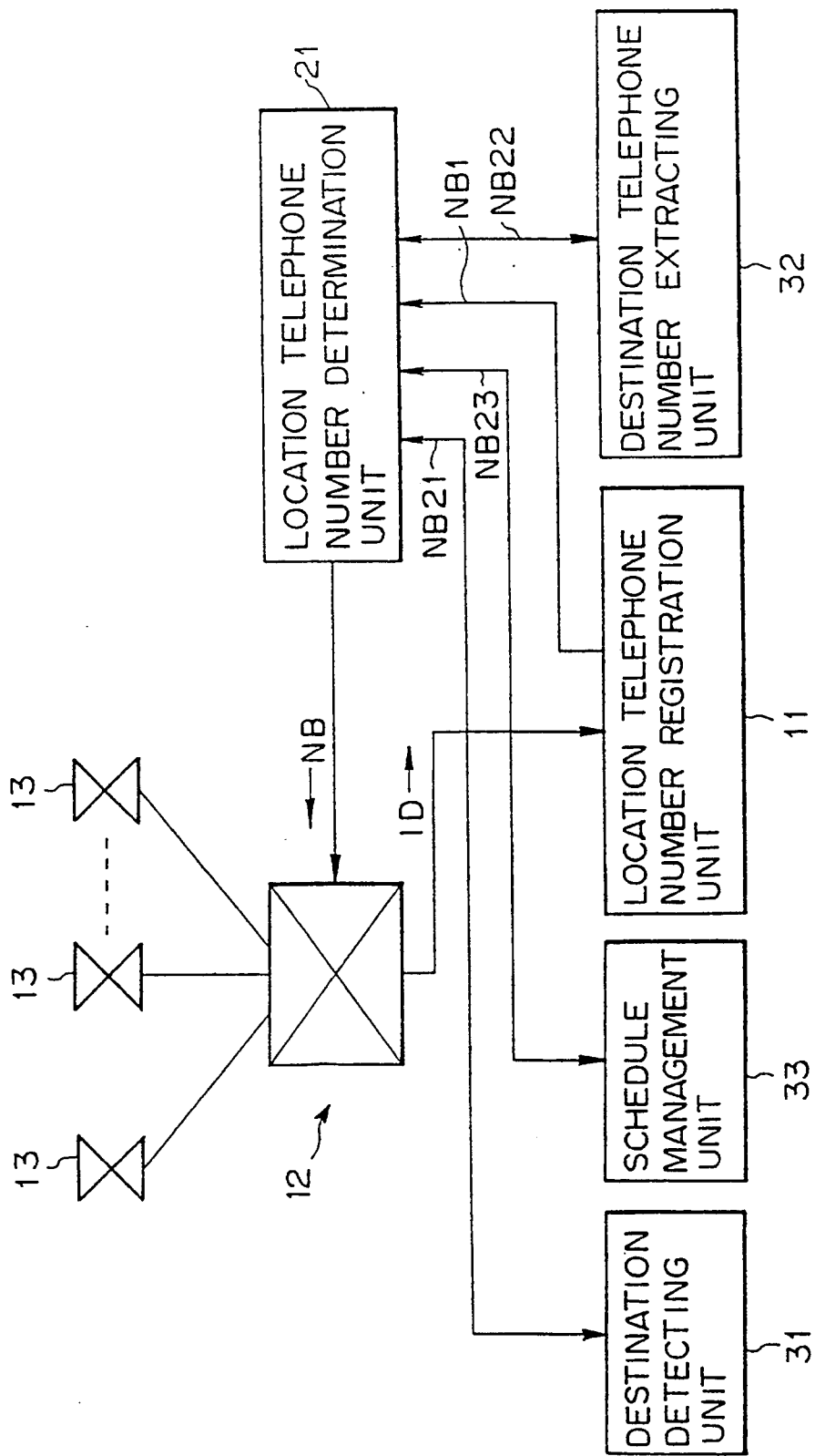
FIG. 5 is a view showing a second embodiment of the system according to the present invention.

FIG. 5 is a view showing a second embodiment of the system according to the present invention. This second embodiment consists of the above-mentioned first embodiment with the addition of a schedule management means 33. This means 33 provides schedule management information NB23 of the call terminating subscriber to the location telephone number determining means 21. This schedule management means 33 is provided in offices having schedule management systems which manage the scheduled destinations (conference rooms etc.) corresponding to personal identification numbers of call terminating subscriber and manages the scheduled destinations and telephone numbers thereof of the call terminating subscriber.

The location telephone number determining means 21 retrieves, compares, and checks information held by the schedule management means 33 for a personal identification number input from a subscriber telephone set 13, determines the telephone number of the destination of the call terminating subscriber, and notifies it to the exchange 12.

In actual operation, when the location telephone number determining means 21 judges that the telephone number of the call terminating subscriber cannot be specified by the location telephone number registration means 11 or the telephone number of the call terminating subscriber cannot be specified by the destination telephone number extracting means 32 which extracts the telephone number based on the location of the call terminating subscriber detected by the destination detecting means 31, the means 21 finds the telephone number by the schedule management means 33.

Figure 6:
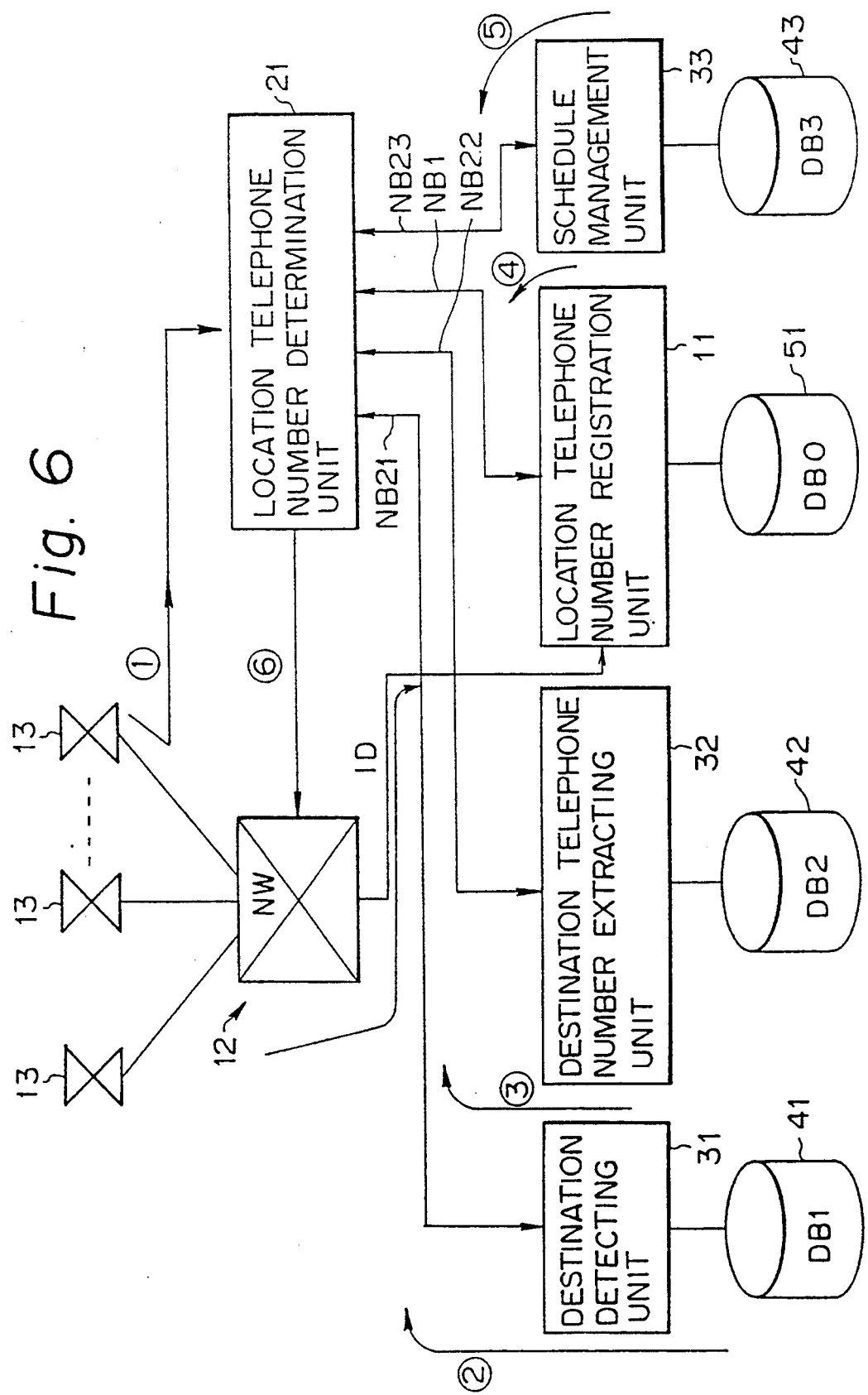
FIG. 6 is a view showing somewhat more specifically the system according to the present invention.

FIG. 6 is a view showing somewhat more specifically the system according to the present invention and is based on the above-mentioned second embodiment. If based on the first embodiment, the blocks 33 and 43 would be excluded from the figure.

In FIG. 6, the file units forming the data base (DB) are shown by reference numerals 41, 42, 42, and 51. The individual data bases in the file units are shown by DB1, DB2, DB3, and DB0. The contents of them are as follows:

DB1: Information on current destinations
DB2: Information on destination telephone numbers
DB3: Information for schedule management
DB0: Telephone numbers of locations registered by call terminating subscribers at destinations A telephone system constructed in this way has the subscriber telephone sets 13 which registers the personal identification numbers ID in advance in the file units 51 as DB0. When a personal identification number ① (ID) input from a subscriber telephone set 13 by a call originating subscriber is received by the electronic exchange 12 and a request for the personal search telephone operation is recognized, the electronic exchange 12 notifies the personal identification number ① to the location telephone number determining means 21 and requests the desired telephone number. The location telephone number determining means 21 uses the personal identification number ① as a retrieval key and learns the current destination information ② (NB21) from the current destination information data base DB1 managed through the current destination detecting means 31, for example, an entry/exit management apparatus, obtains the destination telephone number information ③ (NB22), obtains the location telephone number information ④ (NB1) from the location telephone number information data base DB0 managed through the location telephone number registration means 11, and thus obtains the telephone number of the location of the call terminating subscriber.

The location telephone number determining means 21 first compares the current destination information ② with the telephone number given by the location telephone number information ④ and if they match notifies the location telephone number information ④ to the electronic exchange 12 as the telephone number ⑥ (NB) which is to be searched.

If the location telephone number information ④ and the current destination information ② do not match, the telephone number information ③ corresponding to the current destination information ② is notified to the electronic exchange 12 as the telephone number ⑥ which is to be searched.

If the current destination information ② is blank, i.e., the call terminating subscriber is at a destination which cannot be covered by the entry/exit management apparatus 31, the telephone number ⑤ obtained from the schedule management means 33 is notified to the electronic exchange 12 as the telephone number ⑥ which is to be searched.

Further, when the current destination information ②, destination telephone number information ③, and the telephone number information ⑤ are all blank, the predetermined telephone number ④ corresponding to the personal identification number ① (in general, the key telephone number of the sector to which the call terminating subscriber belongs) is notified to the electronic exchange 12 as the telephone number ⑥ which is to be searched.

The electronic exchange 12 connects, using the telephone number ⑥, the subscriber telephone set 13 at which the personal identification number ① has input.

Figure 7B:
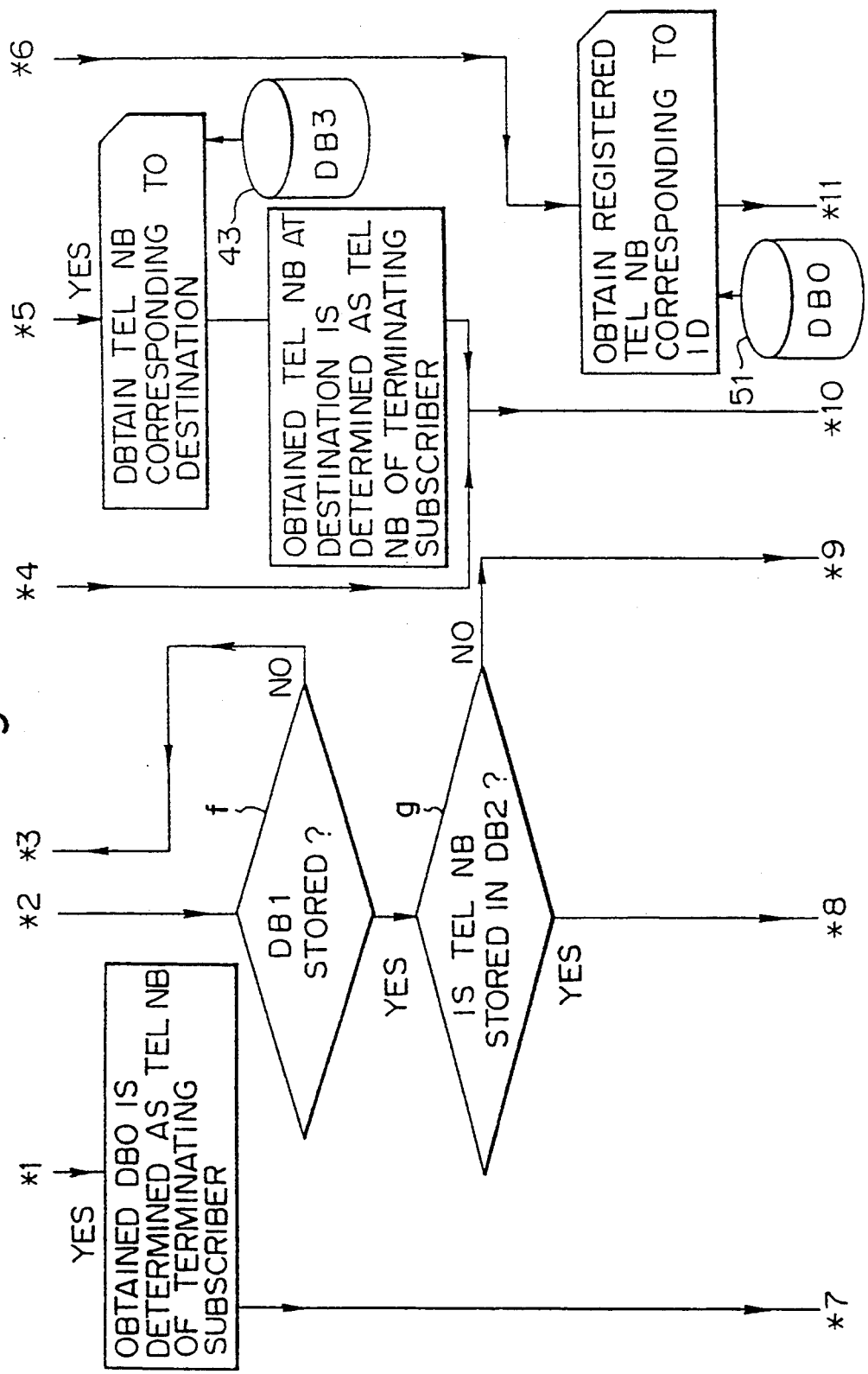
FIGS. 7A(7A-1, 7A-2), 7B, and 7C show a flow chart showing an example of the operation of the location telephone number determining means according to the present invention.

Note that in the above example, the apparatuses 31, 32, 33, 21, and 11 making up the location telephone number determining means 21 were provided as independent apparatuses, but if the desired information can be managed as a whole, a single apparatus may be provided. Further, two or three or even more apparatuses may be provided. Further, these apparatuses may be realized using specialized hardware or using software using a general purpose computer, etc. All the apparatuses may be included in the electronic exchange 12. Whatever the case, the principle and effects are all the same. When software is used, the flow chart shown in FIGS. 7A, 7B, and 7C may be applied, and when hardware is used, the block construction of the later mentioned FIG. 8 may be applied. Each of these, however, are just examples.

FIGS. 7A(7A-1, 7A-2), 7B, and 7C show a flow chart showing an example of the operation of the location telephone number determining means according to the present invention. The term "registered telephone number" means a telephone number which is fixedly registered for the call terminating subscriber, e.g., the telephone number of the telephone sets at his home or office. Near the steps in which the file units are directly the referred to respective file units are illusted at corresponding steps. The exchange 12 and the subscriber telephone set 13 are also illustrated near the related steps.

Step a of FIG. 7A also exists in the conventional automatic personal search telephone apparatus, but one of the features of the present invention is that when "Yes", investigation is further made of the probability of the location telephone number using as a hint the above-mentioned second information. Another characteristic of the present invention is that when "No", after step c, the location of the call terminating subscriber is designated and the telephone number at the location is determined.

The original first information NB1 and the second information NB2 of the present invention are considered comprehensively and, finally, at step d of FIG. 7C, determination is made of the telephone number of the location where the call terminating subscriber is most likely to be, notification is made to the exchange 12, and the call terminating subscriber desired by the call originating subscriber is connected to the subscriber telephone set 13.

Figure 8:
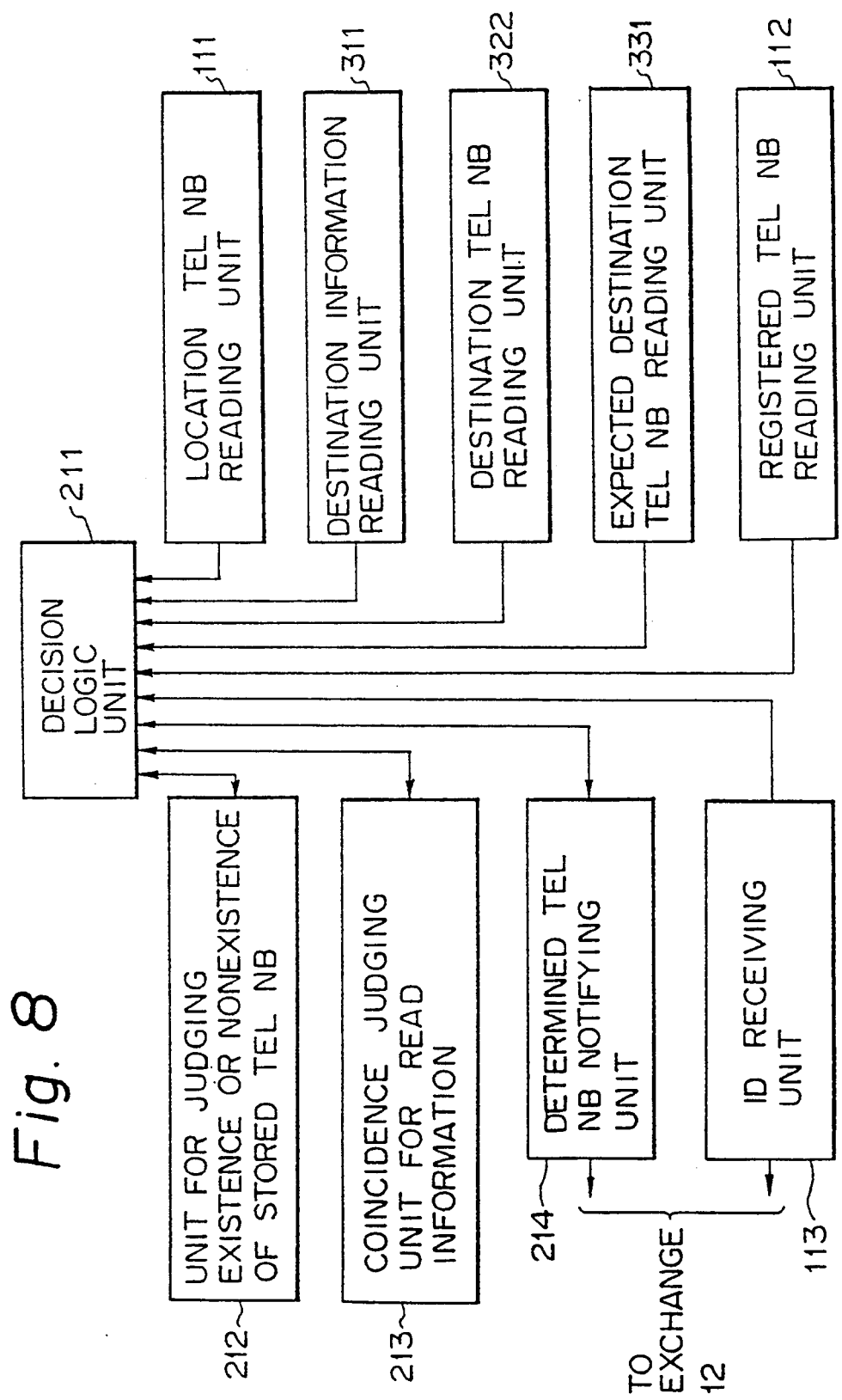
FIG. 8 is a view showing an example of the hardware of a logical processing portion of a location information source and a location telephone number determining means according to the present invention.

FIG. 8 is a view showing an example of the hardware of a logical processing portion of a location information source and a location telephone number determining means according to the present invention. This is an example of the hardware construction of the portion but the file units in FIG. 6 are omitted. In the figure, the group of blocks to the right of a decision logic unit 211 is the portion for reading out data from the corresponding file units (41, 42, 43, and 51). Those blocks which are given reference numerals where the two hundred-place and ten-place digit numbers are the same as reference numerals in FIG. 6 correspond to those functional portions. That is, the location telephone number reading unit 111 and the registered telephone number (telephone number of home position of subscribers) reading unit 112 correspond to the location telephone number registration means 11 of FIG. 6, the destination information reading unit 311 corresponds to the destination detecting means 31 of FIG. 6, and the destination telephone number reading unit 321 corresponds to the destination telephone number extracting means 32 of FIG. 6. The data read out from these reading units are used as the input of the decision logic unit 211.

When the personal identification number of the desired call terminating subscriber is input by the call originating subscriber to the exchange 12, this is received by the personal identification number registration unit 113 and the decision logic unit 211 corresponding to the location telephone number determining means 21 is made active. The activated decision logic unit 211 successively fetches read data from the above-mentioned reading unit and determines the telephone number of the call terminating subscriber sought. During this decision, several decision logic processings are required. These are performed by the unit 212 for judging the existence or nonexistence of the stored telephone number and the coincidence judging unit 213 for read information. The former judging unit 212 is the functional equivalent of the steps a, c, and e of FIG. 7A and steps f and g of FIG. 7B. The latter judging unit 212 is the functional equivalent of step b in FIG. 7A.

The destination telephone number extracting means 32 in both the first embodiment and the second embodiment is a memory which stores, in a form of table for each of the locations, the telephone numbers corresponding to locations of destinations of the call terminating subscribers.

The destination detecting means 31 in the first embodiment and the second embodiment will be explained in further detail below.

First, the means 31 may be a detector, for example, a time clock (time recorder), which produces work attendance/absence information managed using, as a medium, IC cards or other personal cards of the call terminating subscriber used when call terminating subscriber enter or exit a building or room.

Second, the means 31 may be a detector, for example, a pass room checker which produces entry/exit information managed using, as a medium, IC cards or other personal cards of call terminating subscriber used when entering or existing a building or room.

Figure 9:
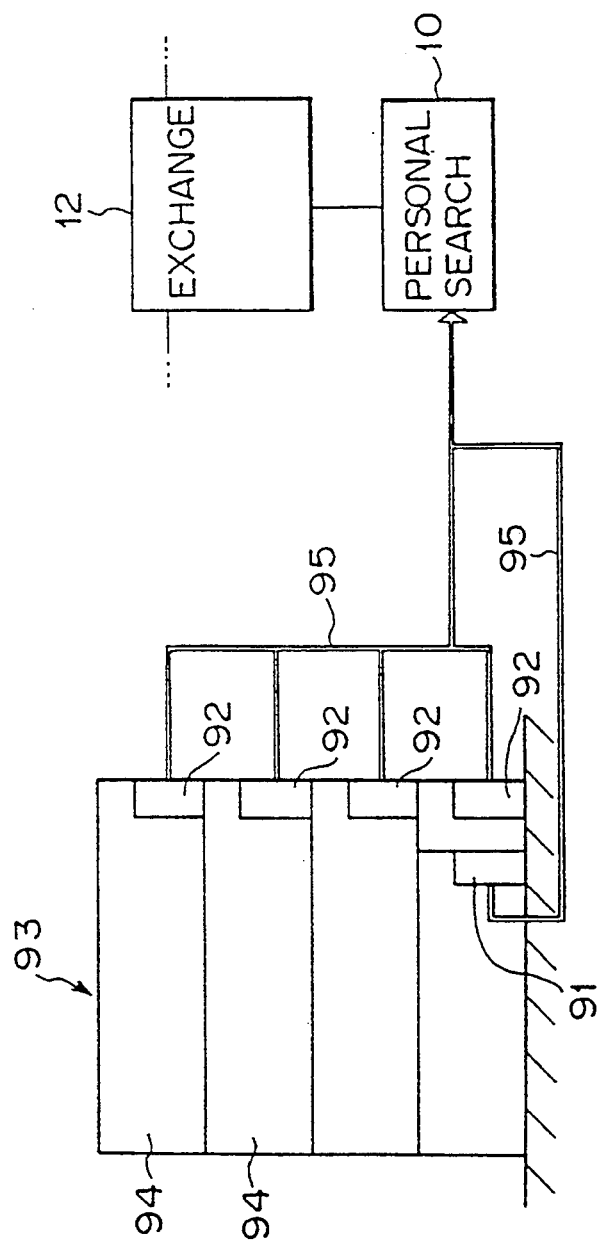
FIG. 9 is a view showing a first and second example of a destination detecting means.

FIG. 9 is a view showing first and second examples of a destination detecting means. The above-mentioned time recorder (first example) is shown by reference numeral 91 and the above-mentioned pass room checker (second example) by 92. Note that in FIG. 9, reference numeral 10 is an automatic personal search telephone apparatus according to the present invention, 93 is a building, 94 is a room, and 95 is a data bus.

Third, the destination detecting means 31 is a password entry device, for example, a 10-key or ID card reader, which receives as input personal password information on terminal equipment which a call terminating subscriber can use when the call terminating subscriber uses terminal equipment. If the terminal equipment is digital telephone equipment, it may be pushbutton. In general, the terminal equipment is a personal computer or work station.

Figure 10:
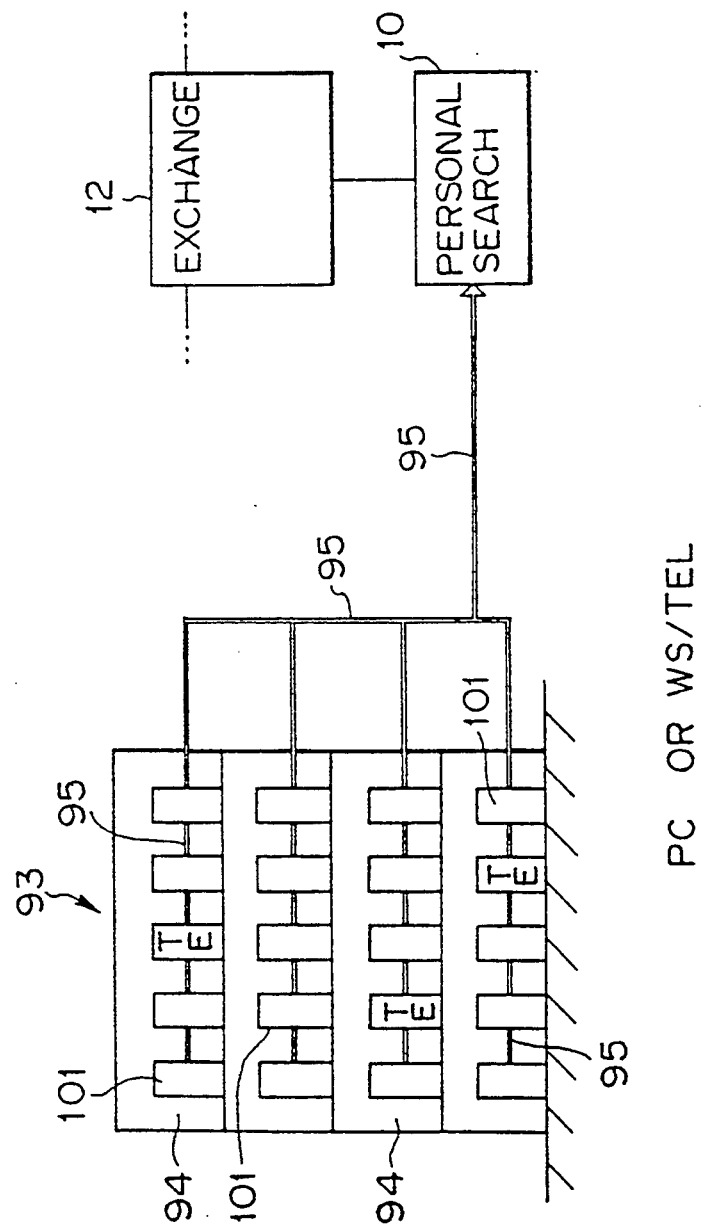
FIG. 10 is a view showing a third example of a destination detecting means.

FIG. 10 is a view showing a third example of a destination detecting means. The above-mentioned terminal equipment (TE) is shown by reference numeral 101. This has a password entry device attached (third example).

Fourth, the destination detecting means 31 may be comprised of a personal, portable transmitter carried by call terminating subscriber, the personal identification number information corresponding to the call terminating subscriber being transmitted by ratio waves from the transmitters. The ratio waves are received by receivers in the rooms.

Figure 11:
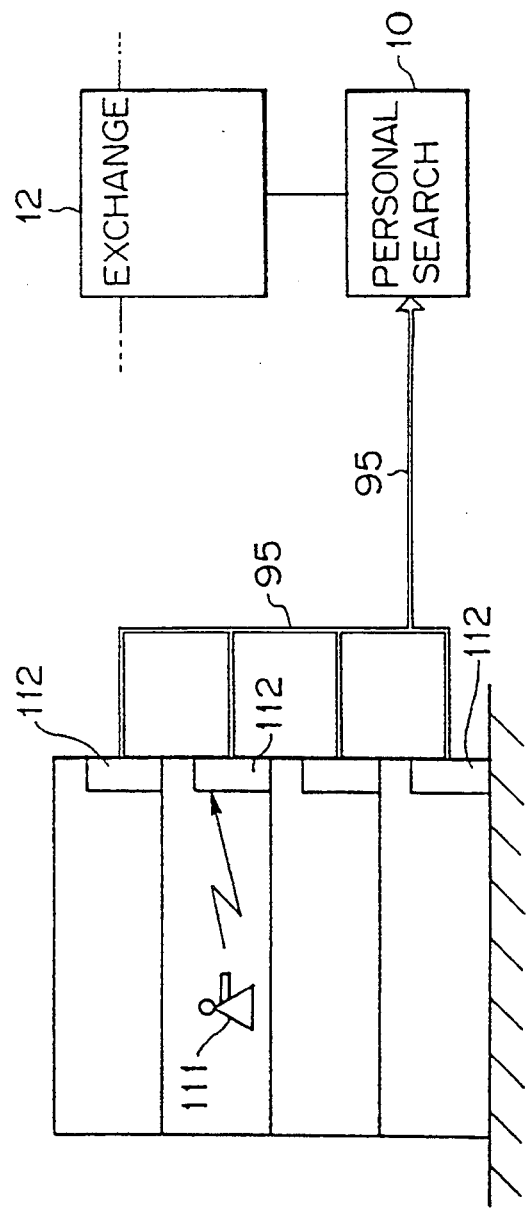
FIG. 11 is a view showing a fourth example of a destination detecting means.

FIG. 11 is a view showing the fourth example of a destination detecting means. The above-mentioned transmitter and receiver (fourth example) are shown respectively by reference numerals 111 and 112.

Next, an explanation will be made of the automatic personal search telephone system according to the present invention.

Figure 12:
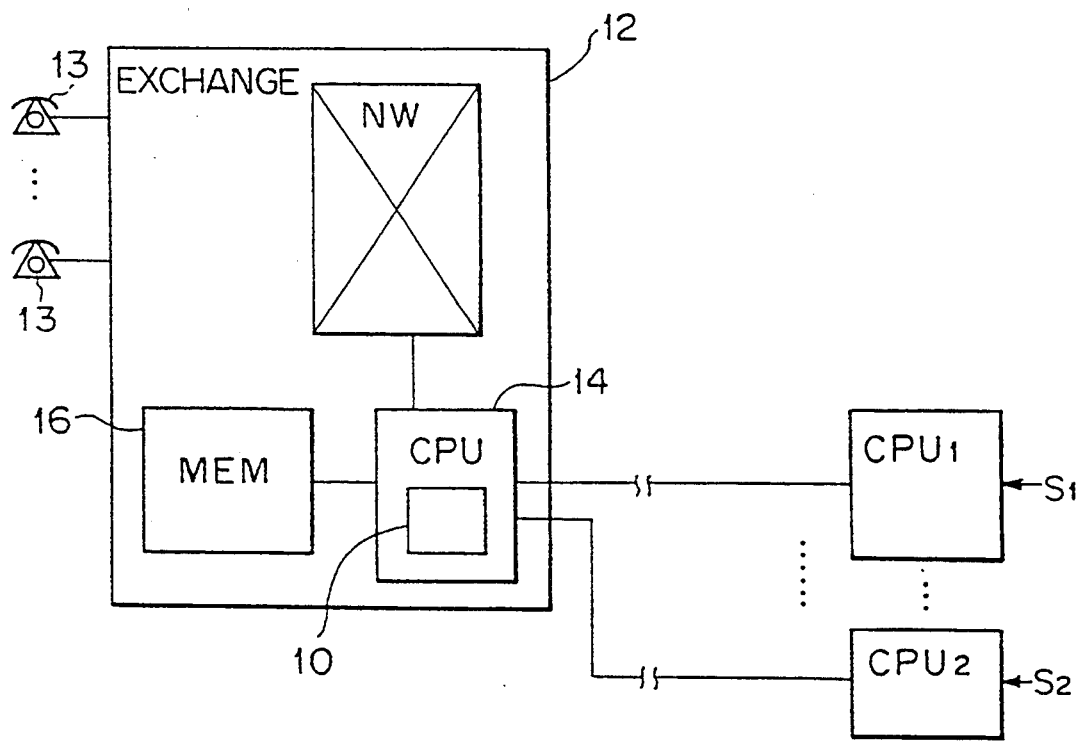
FIG. 12 is a view showing a first example of the constitution of the automatic personal search telephone system according to the present invention.

FIG. 12 is a view showing a first example of the constitution of the automatic personal search telephone system according to the present invention. In the first example, the automatic personal search telephone apparatus 10 according to the present invention is formed integrally inside the exchange 12. In FIG. 12, the automatic personal search telephone apparatus 10 is shown assembled in the central processing unit (CPU) 14 in the exchange 12. Reference numeral 16 is a memory (MEM) which cooperates with the CPU 14.

The $CPU_1$ is the central processing unit serving as the center of a work attendance/absence management system. The work attendance/absence information $S_1$ is input and the predetermined processing is performed, then the data of the call terminating subscribers is supplied to the CPU 14.

The $CPU_2$ is a central processing unit serving as the center of, for example, a building management system. The information $S_2$ in the building for the call terminating subscriber is input and the predetermined processing performed, then the data on the call terminating subscribers is supplied to the CPU 14.

Figure 13:
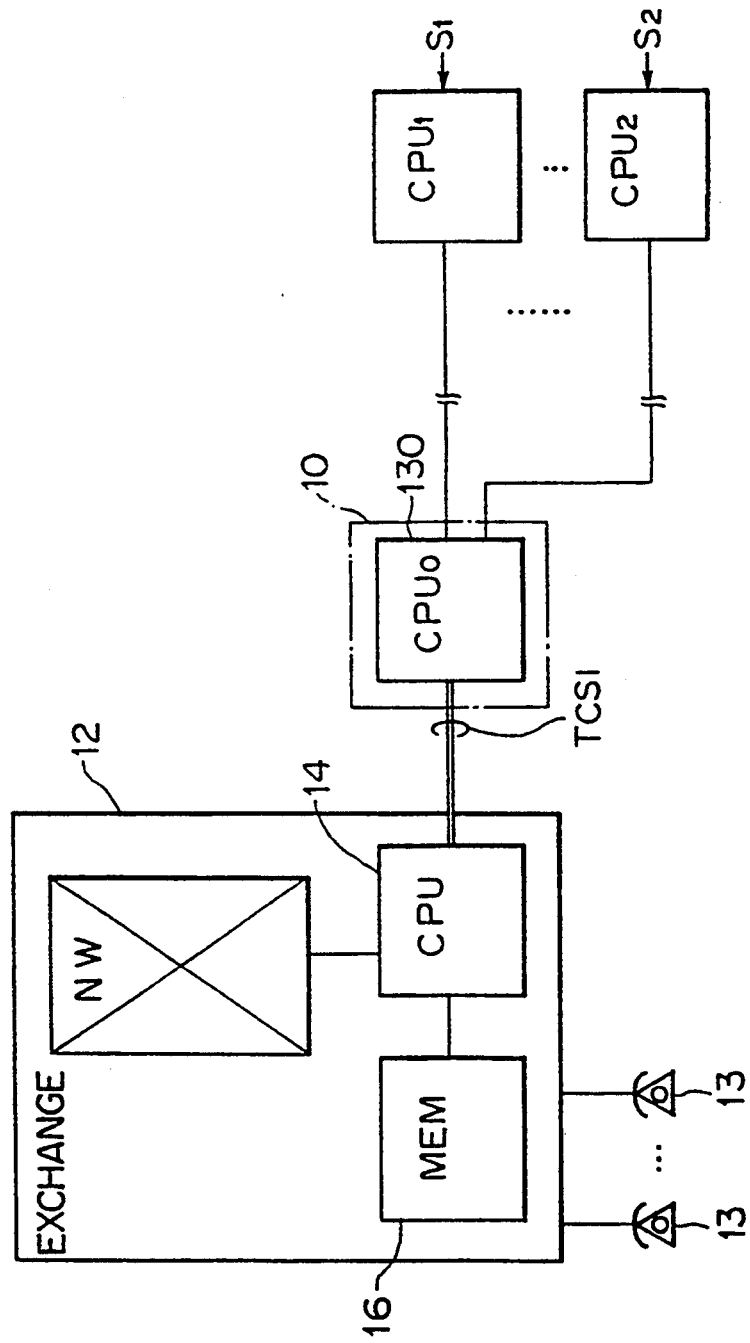
FIG. 13 is a view showing a second example of the constitution of the automatic personal search telephone system according to the present invention.

FIG. 13 is a view showing a second example of the constitution of the automatic personal search telephone system according to the present invention. In this second example, the automatic personal search telephone apparatus 10 according to the present invention is provided separately outside the exchange 12. In FIG. 13, the central processing unit ($CPU_0$) serving as the center of the external automatic personal search telephone apparatus 10 is shown cooperating with the CPU 14 in the exchange 12. The CPU 14 and the $CPU_0$ are connected by a TCSI. TCSI stands for a telecommunication and computer service interface. Note that the $CPU_1$, $CPU_2$, $S_1$, and $S_2$ are as explained in FIG. 12. Therefore, the CPU 14 obtains the destination information of the call terminating subscriber from the external $CPU_0$ and controls the network NW using this as control information.

Figure 14:
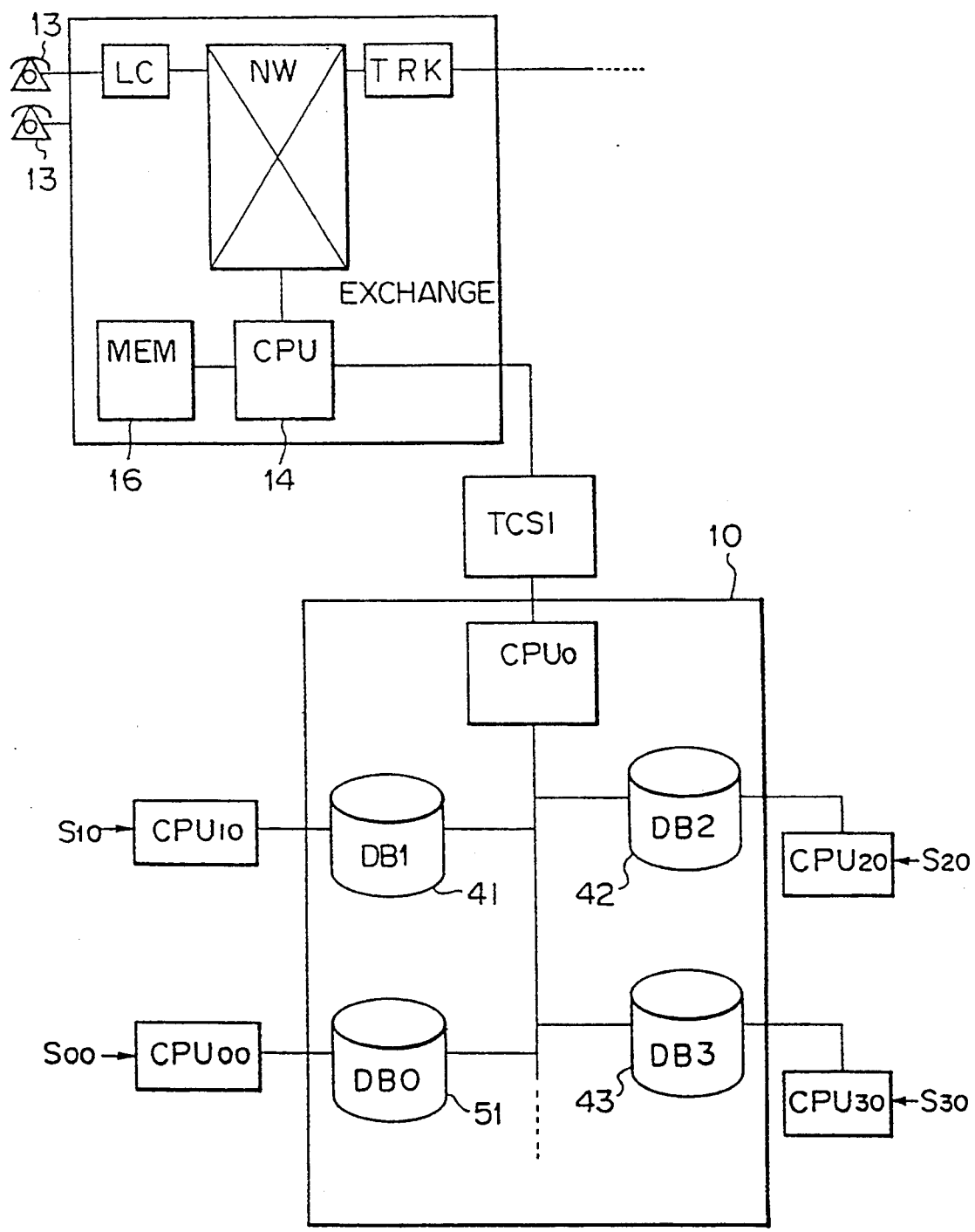
FIG. 14 is a view showing in further detail the example of constitution of the system of FIG. 13.

FIG. 14 is a view showing in further detail the example of constitution of the system of FIG. 13. In the figure, the inside of the automatic personal search telephone apparatus 10 is drawn in somewhat more detail compared with FIG. 13. The $CPU_0$ has connected to it through a common bus four data bases DB0 to DB3. However, these data bases are also shown in FIG. 6.

The data bases DB0 to DB3 are managed by the central processing units $CPU_{00}$ to $CPU_{30}$. The $CPU_{00}$ to $CPU_{30}$ collect various types of information $S_{00}$ to $S_{30}$.

LC in FIG. 14 is a line circuit, and TRK is a trunk.

Figure 15:
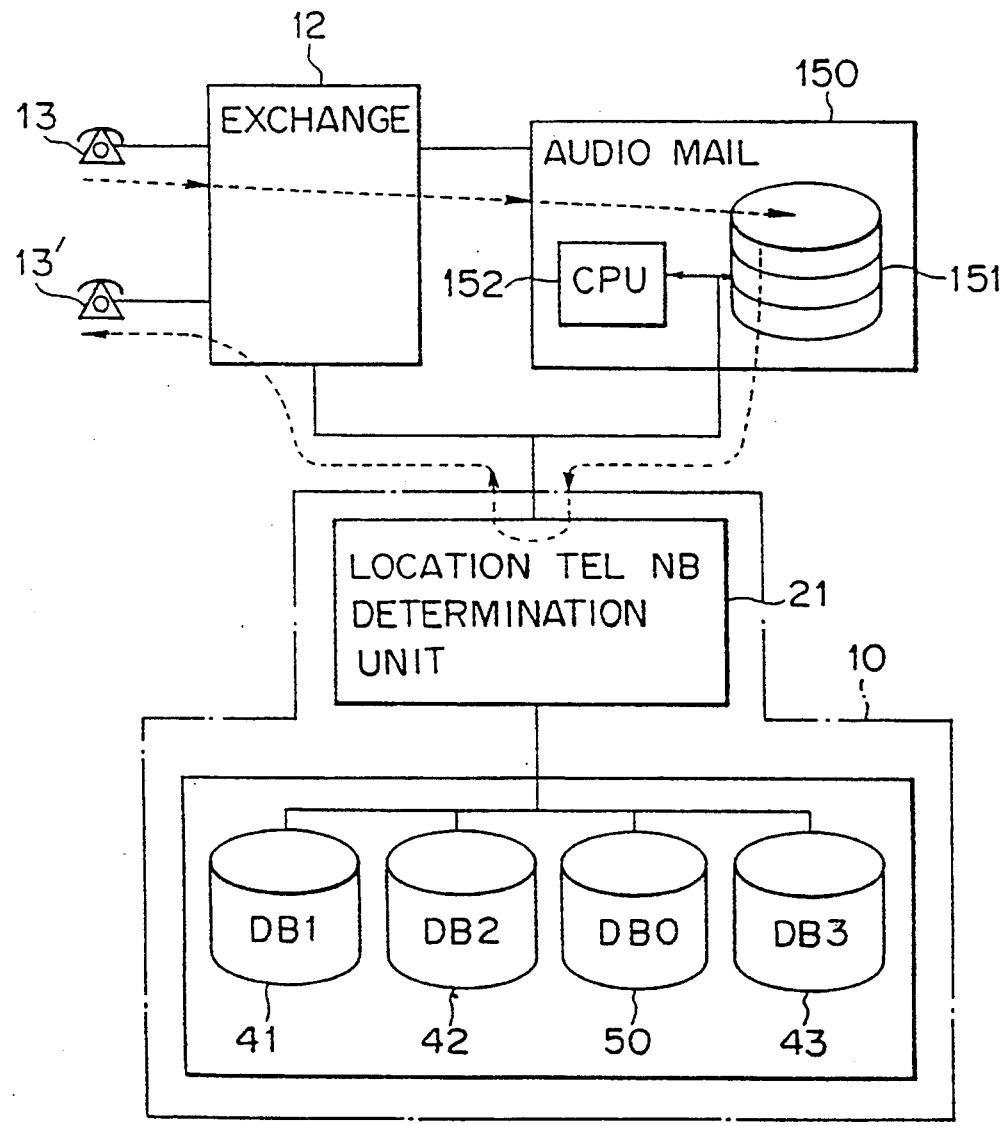
FIG. 15 is a view showing a third example of the constitution of the automatic personal search telephone system according to the present invention.

FIG. 15 is a view showing a third example of the constitution of the automatic personal search telephone system according to the present invention. The characteristic feature of the third example is that the call originating subscriber can register voice mail from the subscriber telephone set 13 and that voice mail can be transmitted to the subscriber telephone set 13' at the destination of the call terminating subscriber. For this reason, a well known voice mail apparatus 150 is connected to the exchange 12. In the apparatus 150 is a file 151 which records voice mail.

When the time for transmitting the voice mail to the call terminating subscriber is designated, when that time comes, the location telephone number determining means 21 deduces the location of the call terminating subscriber at that time and sends the voice mail to the subscriber telephone set 13' nearest to the call terminating subscriber. The location of the call terminating subscriber is deduced by reference to the various types of data bases (DB).

The operation is as follows. The exchange 12 receives from the call originating subscriber (13) the personal identification number ID as an originating call. The exchange 12, when judging by that call that it must perform the voice mail service, records the voice mail for the call terminating subscriber in the file corresponding to the ID.

The CPU 152 in the voice mail apparatus 150 accesses the automatic personal search telephone apparatus 10 by the ID. If the time of delivery of the voice mail is designated, when that time comes, the CPU 152 accesses the apparatus 10. The apparatus 10 finds the subscriber telephone set 13' near the current location of the call terminating subscriber by the location telephone number determining means 21, calls it up, and sends the voice mail.

Figure 16:
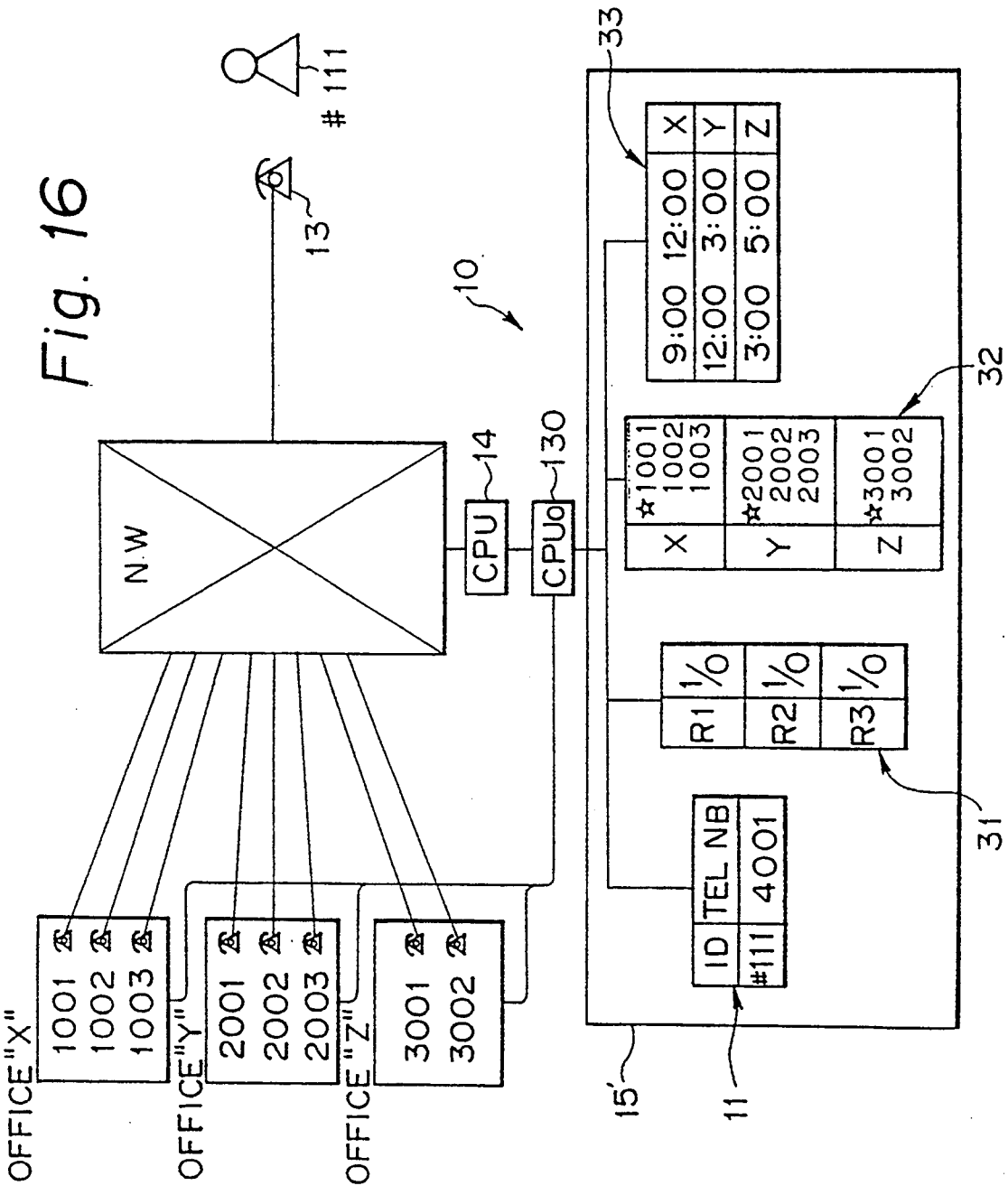
FIG. 16 is a view showing the specific image of the automatic personal search telephone system according to the present invention.

FIG. 16 is a view showing the specific image of the automatic personal search telephone system according to the present invention and makes much clearer the difference from the conventional system (FIG. 2). In the memory 15', the memory area of the location telephone number registration means 11, the memory area of the destination detecting means 31, the memory area of the destination telephone number extracting means 32, and the memory area of the schedule management means 33 are shared. In the memory area 11 is formed a table of pairs of ID's and telephone numbers, in the memory area 31 is formed a table showing if a call terminating subscriber corresponding to an ID is in a room (room 1, room 2, room 3, . . .), and in memory area 32 is formed a table comprised of pairs of offices (X, Y, Z...) and telephone numbers used in the same. The star symbols show key telephone numbers. In the memory area 33 is formed a schedule table of the call terminating subscriber corresponding to the ID.

As explained above, according to the present invention, reference is made to the destinations of a call terminating subscriber, the destination telephone numbers, the scheduled destinations, the scheduled destination telephone numbers, and the key telephone numbers of the destinations for a personal identification number input by a call originating subscriber and a decision is made as to the telephone number of the place envisioned as the location of the call terminating subscriber, so there is the effect that it is possible to access the nearest telephone at the destination of the call terminating subscriber and even if the call terminating subscriber forgets to register the telephone number of his destination, it is possible to call the destination of the call terminating subscriber, so quick contact is possible and work can be performed without loss of time, so the contribution to improvement of work efficiency is great.

We claim:

1. An automatic personal search telephone system comprising:

an automatic personal search telephone apparatus and an exchange which cooperates with said automatic personal search telephone apparatus and, when a personal identification number is given as an originating call, transfers the call to a subscriber telephone set nearest to the location of a call terminating subscriber corresponding to said personal identification number, said automatic personal search telephone apparatus including:

a location telephone number registration means which registers a telephone number of a telephone set at one of an originally registered location of said call terminating subscriber and a new location of said call terminating subscriber, which may be registered by said call terminating subscriber if said call terminating subscriber changes his original location to said new location;

a destination detecting means which detects a current location of said call terminating subscriber, said current location being a location where said call terminating subscriber may be currently present;

a destination telephone number extracting means which stores telephone numbers of said call terminating subscriber at various destinations to which said call terminating subscriber may travel and extracting from stored telephone numbers a telephone number of said call terminating subscriber in accordance with said current location of said call terminating subscriber detected by said destination detecting means; and a location telephone number determining means connected to said location telephone number registration means and said destination telephone number extracting means for determining an actual current telephone number of said call terminating subscriber given by said location telephone number registration means or by said destination telephone number extracting means;

said location telephone number determining means performing a call terminating operation to said a registered telephone number if said registered telephone number of said originally registered location is at a location which is detected by said destination detecting means, and if said registered telephone number at said originally registered location is not at a location which is detected by said destination detecting means, said location telephone number determining means performing a call-terminating operation to a telephone number corresponding to a location specified by said destination telephone number extracting means.

2. A system as set forth in claim 1, wherein said destination telephone number extracting means is a memory which stores as a table, for each position of a destination of said call terminating subscriber, telephone numbers corresponding to each respective position.

3. A system as set forth in claim 1, wherein said destination detecting means is comprised of receivers and personal portable transmitters carried by call terminating subscribers, personal identification number information corresponding to the call terminating subscribers is transmitted by ratio waves from said transmitters, and is received by said receivers.

4. A system as set forth in claim 1, wherein said automatic personal search telephone apparatus is built in said exchange.

5. A system as set forth in claim 1, wherein said automatic personal search telephone apparatus is provided separate from and outside said exchange.

6. An automatic personal search telephone system comprising:

an automatic personal search telephone apparatus and an exchange which cooperates with said automatic personal search telephone apparatus and, when a personal identification number is given as an originating call, transfers the call to a subscriber telephone set nearest to the location of a call terminating subscriber corresponding to said personal identification number, said automatic personal search telephone apparatus including:

a location telephone number registration means which registers a telephone number of a telephone set at one of an originally registered location of said call terminating subscriber and a new location of said call terminating subscriber, which may be registered by said call terminating subscriber if said call terminating subscriber changes his original location to said new location;

a destination detecting means which detects a current location of said call terminating subscriber, said current location being a location where said call terminating subscriber may be currently present;

a destination telephone number extracting means which stores telephone numbers of said call terminating subscriber at various destinations to which said call terminating subscriber may travel and extracting from stored telephone numbers a telephone number of said call terminating subscriber in accordance with said current location of said call terminating subscriber detected by said destination detecting means; and a location telephone number determining means connected to said location telephone number registration means and said destination telephone number extracting means, for determining an actual current telephone number of said call terminating subscriber given by said location telephone number registration means or by said destination telephone number extracting means, wherein said destination detecting means is a detector which produces work attendance and work absence information using a personal card for storing personal information of a call terminating subscriber when said call terminating subscriber enters or exits a building or a room.

7. An automatic personal search telephone system comprising:

an automatic personal search telephone apparatus and an exchange which cooperates with said automatic personal search telephone apparatus and, when a personal identification number is given as an originating call, transfers the call to a subscriber telephone set nearest to the location of a call terminating subscriber corresponding to said personal identification number, said automatic personal search telephone apparatus including:

a location telephone number registration means which registers a telephone number of a telephone set at one of an originally registered location of said call terminating subscriber and a new location of said call terminating subscriber, which may be registered by said call terminating subscriber if said call terminating subscriber changes his original location to said new location;

a destination detecting means which detects a current location of said call terminating subscriber, said current location being a location where said call terminating subscriber may be currently present;

a destination telephone number extracting means which stores telephone numbers of said call terminating subscriber at various destinations to which said call terminating subscriber may travel and extracting from stored telephone numbers a telephone number of said call terminating subscriber in accordance with said current location of said call terminating subscriber detected by said destination detecting means; and a location telephone number determining means connected to said location telephone number registration means and said destination telephone number extracting means for determining an actual current telephone number of said call terminating subscriber given by said location telephone number registration means or by said destination detecting means, wherein said destination detecting means is a detector which produces entry information and exit information using a personal card for storing personal information of a call terminating subscriber when said call terminating subscriber enters or exists a building or a room.

8. An automatic personal search telephone system comprising:

an automatic personal search telephone apparatus and an exchange which cooperates with said automatic personal search telephone apparatus and, when a personal identification number is given as an originating call, transfers the call to a subscriber telephone set nearest to the location of a call terminating subscriber corresponding to said personal identification number, said automatic personal search telephone apparatus including:

a location telephone number registration means which registers a telephone number of a telephone set at one of an originally registered location of said call terminating subscriber and a new location of said call terminating subscriber, which may be registered by said call terminating subscriber if said call terminating subscriber changes his original location to said new location;

a destination detecting means which detects a current location of said call terminating subscriber, said current location being a location where said call terminating subscriber may be currently present;

a destination telephone number extracting means which stores telephone numbers of said call terminating subscriber at various destinations to which said call terminating subscriber may travel and extracting from stored telephone numbers a telephone number of said call terminating subscriber in accordance with said current location of said call terminating subscriber detected by said destination detecting means; and a location telephone number determining means connected to said location telephone number registration means and said destination telephone number extracting means for determining an actual current telephone number of said call terminating subscriber given by said location telephone number registration means or by said destination telephone number extracting means, wherein said destination detecting means is a password entry device for entry of personal password information to a communication terminal equipment to be used by call terminating subscribers.

9. An automatic personal search telephone system comprising:

an automatic personal search telephone apparatus and an exchange which cooperates with said automatic personal search telephone apparatus and, when a personal identification number is given as an originating call, transfers the call to a subscriber telephone set nearest to the location of a call terminating subscriber corresponding to said personal identification number, said automatic personal search telephone apparatus including:

a location telephone number registration means which registers a telephone number of a telephone set at one of an originally registered location of said call terminating subscriber and a new location of said call terminating subscriber, which may be registered by said call terminating subscriber if said call terminating subscriber changes his original location to said new location;

a destination detecting means which detects a current location of said call terminating subscriber, said current location being a location where said call terminating subscriber may be currently present;

a destination telephone number extracting means which stores telephone numbers of said call terminating subscriber at various destinations to which said call terminating subscriber may travel and extracting from stored telephone numbers a telephone number of said call terminating subscriber in accordance with said current location of said call terminating subscriber detected by said destination detecting means; and a location telephone number determining means connected to said location telephone number registration means and said destination telephone number extracting means for determining an actual current telephone number of said call terminating subscriber given by said location telephone number registration means or by said destination telephone number extracting means, wherein said automatic personal search telephone apparatus further includes a schedule management means which provides schedule management information on said call terminating subscriber to said location telephone number determining means.

10. An automatic personal search telephone system comprising:

an automatic personal search telephone apparatus and an exchange which cooperates with said automatic personal search telephone apparatus and, when a personal identification number is given as an originating call, transfers the call to a subscriber telephone set nearest to the location of a call terminating subscriber corresponding to said personal identification number, said automatic personal search telephone apparatus including:

a location telephone number registration means which registers a telephone number of a telephone set at one of an originally registered location of said call terminating subscriber and a new location of said call terminating subscriber, which may be registered by said call terminating subscriber if said call terminating subscriber changes his original location to said new location;

a destination detecting means which detects a current location of said call terminating subscriber, said current location being a location where said call terminating subscriber may be currently present;

a destination telephone number extracting means which stores telephone numbers of said call terminating subscriber; at various destinations to which said call terminating subscriber may travel and extracting from stored telephone numbers a telephone number of said call terminating subscriber in accordance with said current location of said call terminating subscriber detected by said destination detecting means; and a location telephone number determining means connected to said location telephone number registration means and said destination telephone number extracting means for determining an actual current telephone number of said call terminating subscriber given by said location telephone registration means or by said destination telephone number extracting means, wherein there is further provided a voice mail apparatus connected to said exchange and said automatic personal search telephone apparatus, wherein when said exchange receives voice mail addressed to said call terminating subscriber specified by said personal identification number from a call originating subscriber, said voice mail is registered once in said voice mail apparatus and, further, said voice mail apparatus, by using said personal identification number, accesses said automatic personal search telephone apparatus and transfers said voice mail through said exchange to said call terminating subscriber.

11. A system as set forth in claim 10, wherein when a time for delivery of said voice mail is designated, said voice mail apparatus accesses said automatic personal search telephone apparatus when said designated time has arrived.

12. An automatic personal search telephone system comprising:

an automatic personal search telephone apparatus; and an exchange which cooperates with said automatic personal search telephone apparatus and, when there is a call using a personal identification number, transfers the call to a subscriber telephone set nearest to the location of a call terminating subscriber corresponding to said personal identification number, said automatic personal search telephone apparatus including:

a location telephone number registration means which registers a telephone number of a telephone set at one of an originally registered location of said call terminating subscriber and a new location of said call terminating subscriber, which may be registered by said call terminating subscriber if said call terminating subscriber changes his original location to his new location, a destination detecting means which detects a current location of said call terminating subscriber, said current location being a location where said call terminating subscriber may be currently present, a destination telephone number extracting means which stores telephone numbers of said call terminating subscriber at various destinations to which said call terminating subscriber may travel and extracting from stored telephone numbers a telephone number of said call terminating subscriber in accordance with said current location of said call terminating subscriber detected by said destination detecting means;

a schedule management means which provides schedule management information of said call terminating subscriber; and a location telephone number determining means which receives said schedule management information from said schedule management means and determines a current telephone number of said call terminating subscriber based on a scheduled destination of said call terminating subscriber given from said schedule management means when the current telephone number of said call terminating subscriber cannot be determined from said location telephone number registration means or from said destination telephone number extracting means.

13. A system as set forth in claim 12, wherein said destination telephone number extracting means is a memory which stores as a table, for each position of a destination of said call terminating subscriber, telephone number corresponding to said position.

14. A system as set forth in claim 12, wherein said destination detecting means is a detector which produces work attendance and work absence information using a personal card of a call terminating subscriber when call terminating subscriber enters or exists a building or a room.

15. A system as set forth in claim 12, wherein said destination detecting means is a detector which produces entry information and exit information using a personal card of a call terminating subscriber when said call terminating subscriber enters or exists a building or a room.

16. A system as set forth in claim 12, wherein said destination detecting means is a password entry device for entry of personal password information to a communication terminal equipment to be used by call terminating subscribers.

17. A system as set forth in claim 12, wherein said destination detecting means is comprised of receivers and personal portable transmitters carried by call terminating subscribers, personal identification number information corresponding to the call terminating subscribers is transmitted by ratio waves from said transmitters, and is received by said receivers.

18. A system as set forth in claim 12, wherein said automatic personal search telephone apparatus is built in said exchange.

19. A system as set forth in claim 12, wherein said automatic personal search telephone apparatus is provided separate from and outside said exchange.

20. An automatic personal search telephone system which comprises an exchange which accommodates a plurality of subscriber telephone sets, a location telephone number determining means, and a location telephone number registration means which is connected to said exchange,
   said location telephone number registration means, when receiving a personal identification number of a call terminating subscriber from a subscriber telephone set of a call originating subscriber, reads out from a registration area corresponding to the personal identification number a telephone number of a subscriber telephone set at one of an originally registered location of the call terminating subscriber and a new location of the call terminating subscriber, which may be registered by the call terminating subscriber if said call terminating subscriber changes his original location to said new location and outputs the telephone number to said location telephone number determining means so that said telephone number is sent to said exchange,
   said location telephone number determining means receiving, as an input, first information read out from said location telephone number registration means and second information supplied from a location information source which collects and holds information relating to various destinations to which the call terminating subscriber may travel and said location telephone number determining means deciding on the telephone number of the place believed to be a current location of said call terminating subscriber, and outputting said telephone number of said place to said exchange.

21. An automatic personal search telephone system which comprises an exchange which accommodates a plurality of subscriber telephone sets, a location telephone number determining means, and a location telephone number registration means which is connected to said exchange,
   said location telephone number registration means, when receiving a personal identification number of a call terminating subscriber from a subscriber telephone set of a call originating subscriber, reads out from a registration area corresponding to the personal identification number a telephone number of a subscriber telephone set at one of an originally registered location of the call terminating subscriber and a new location of the call terminating subscriber which may be registered by the call terminating subscriber if said call terminating subscriber changes his original location to said new location and outputs the telephone number to said location telephone number determining means so that said telephone number is sent to said exchange,
   said location telephone number determining means which receives, as an input, first information read out from said location telephone number registration means and second information supplied from a location information source which collects and holds information relating to various destinations to which the call terminating subscriber may travel, and wherein said location telephone number determining means decides on the telephone number of the place believed to be a current location of said call terminating subscriber, and outputs it to said exchange, and
   said location information source collecting and holding at least one type of information among the destination detection information, previously provided destination telephone number extraction information, and schedule management information for said call terminating subscriber.

22. A system as set forth in claim 21, wherein said location telephone number registration means, said location telephone number determining means, and said location information source are built in said exchange.

23. A system as set forth in claim 21, wherein said location telephone number registration means, said location telephone number determining means, and said location information source are provided separate from and outside of said exchange.

24. An automatic personal search telephone system comprising:
   an automatic personal search telephone apparatus and
   an exchange which cooperates with said automatic personal search telephone apparatus and, when a personal identification number is given as an originating call, transfers the call to a subscriber telephone set nearest to the location of a call terminating subscriber corresponding to said personal identification number,
   said automatic personal search telephone apparatus including:
   a location telephone number registration means which registers a telephone number of a telephone set at one of an originally registered location of said call terminating subscriber and a new location, which may be registered by said call terminating subscriber if said call terminating subscriber changes his original location to said new location;
   a destination detecting means which detects a current location of said call terminating subscriber, said current location being a location where said call terminating subscriber may be currently present;
   a destination telephone number extracting means which stores telephone numbers of said call terminating subscriber at various destinations to which said call terminating subscriber may travel and extracting from stored telephone numbers a telephone number of said call terminating subscriber in accordance with said current location of said call terminating subscriber detected by said destination detecting means;
   a location telephone number determining means connected to said location telephone number registration means and said destination telephone number extracting means for determining an actual current telephone number of said call terminating subscriber given by said location telephone number registration means or by said destination telephone number extracting means; and a schedule management means which provides schedule management information on said call terminating subscriber to said location telephone number determining means.

25. An automatic personal search telephone system comprising:

an automatic personal search telephone apparatus;

an exchange which cooperates with said automatic personal search telephone apparatus and, when a personal identification number is given as an originating call, transfers the call to a subscriber telephone set nearest to the location of a call terminating subscriber corresponding to said personal identification number, said automatic personal search telephone apparatus including:

a location telephone number registration means which registers a telephone number of a telephone set at one of an originally registered location of said call terminating subscriber and a new location which may be registered by said call terminating subscriber if said call terminating subscriber changes his location from the originally registered location to said new location;

a destination detecting means which detects a current location of said call terminating subscriber, said current location being a location where said call terminating subscriber may be currently present;

a destination telephone number extracting means which stores telephone numbers of said call terminating subscriber at various destinations to which said call terminating subscriber may travel and extracting from stored telephone numbers a telephone number of said call terminating subscriber in accordance with said current location of said call terminating subscriber detected by said destination detecting means;

a location telephone number determining means connected to said location telephone number registration means and said destination telephone number extracting means for determining an actual current telephone number of said call terminating subscriber given by said location telephone number registration means or by said destination telephone number extracting means; and a voice mail apparatus connected to said exchange and said automatic personal search telephone apparatus, wherein when said exchange receives voice mail addressed to said call terminating subscriber specified by said personal identification number from a call originating subscriber, said voice mail is registered once in said voice mail apparatus and, further, said voice mail apparatus, by using said personal identification number, accesses said automatic personal search telephone apparatus and transfers said voice mail through said exchange to said call terminating subscriber.

26. A system as set forth in claim 25, wherein when a time for delivery of said voice mail is designated, said voice mail apparatus accesses said automatic personal search telephone apparatus when said designated time has arrived.

* * * * *